United States Patent
Van der Merwe et al.

(10) Patent No.: US 8,856,281 B2
(45) Date of Patent: Oct. 7, 2014

(54) INTERNET PROTOCOL VERSION 6 CONTENT ROUTING

(75) Inventors: Jacobus Van der Merwe, New Providence, NJ (US); Seungjoon Lee, Basking Ridge, NJ (US); Oliver Spatscheck, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 836 days.

(21) Appl. No.: 12/728,911

(22) Filed: Mar. 22, 2010

(65) Prior Publication Data

US 2011/0231475 A1 Sep. 22, 2011

(51) Int. Cl.
 *G06F 15/16* (2006.01)
 *H04L 29/12* (2006.01)
 *H04L 29/08* (2006.01)
 *H04L 25/03* (2006.01)

(52) U.S. Cl.
 CPC ...... *H04L 61/1511* (2013.01); *H04L 29/12066* (2013.01); *H04L 25/03923* (2013.01); *H04L 67/1002* (2013.01); *H04L 67/2842* (2013.01); *H04L 67/288* (2013.01); *H04L 67/1017* (2013.01); *H04L 67/1008* (2013.01)
 USPC .......................................... 709/219; 709/249

(58) Field of Classification Search
 USPC ......... 709/200, 238, 240, 239, 203, 217–219, 709/226; 370/389, 392, 401
 See application file for complete search history.

(56) References Cited

U.S. PATENT DOCUMENTS

| | | | |
|---|---|---|---|
| 5,822,320 A | 10/1998 | Horikawa et al. | |
| 6,327,252 B1 | 12/2001 | Silton et al. | |
| 6,415,323 B1 | 7/2002 | McCanne et al. | |
| 6,446,108 B1 * | 9/2002 | Rosenberg et al. | 709/203 |
| 6,687,731 B1 | 2/2004 | Kavak | |
| 6,785,704 B1 | 8/2004 | McCanne | |
| 6,856,991 B1 * | 2/2005 | Srivastava | 1/1 |
| 6,920,129 B2 | 7/2005 | Preston et al. | |
| 7,047,315 B1 | 5/2006 | Srivastava | |
| 7,088,718 B1 | 8/2006 | Srivastava | |
| 7,254,138 B2 | 8/2007 | Sandstrom | |
| 7,328,009 B2 | 2/2008 | Takeda et al. | |
| 7,330,906 B2 | 2/2008 | Hameleers et al. | |

(Continued)

OTHER PUBLICATIONS

U.S. Appl. No. 12/268,744, filed Nov. 11, 2008.

(Continued)

*Primary Examiner* — Joseph E Avellino
*Assistant Examiner* — Aftab Nasir Khan
(74) *Attorney, Agent, or Firm* — Akerman LLP; Michael K. Dixon; Roy P. Zachariah

(57) ABSTRACT

A content delivery system includes a cache server, a domain name server, and a redirector. The domain name server is configured to receive a request for a cache server address, and provide an IPv6 anycast address. The redirector is configured to receive a content request addressed to the IPv6 anycast address from a client system, receive load information from the cache server, and determine if the cache server is available. The redirector is further configured to forward the content request to the cache server when the cache server is available. The cache server is configured to receive the content request forwarded from the redirectors, send a response to the content request to a client system, the response including an IPv6 unicast address of the cache server as a source address, an IPv6 unicast address of the client system as a destination address, and the IPv6 anycast address as a home address, and provide the content to the requestor.

13 Claims, 7 Drawing Sheets

(56) References Cited

U.S. PATENT DOCUMENTS

| | | | |
|---|---|---|---|
| 7,343,422 B2 | 3/2008 | Garcia-Luna Aceves et al. | |
| 7,903,584 B2* | 3/2011 | Vasseur et al. | 370/255 |
| 8,042,115 B2* | 10/2011 | Dunshea et al. | 718/105 |
| 8,176,203 B1* | 5/2012 | Liu et al. | 709/238 |
| 2002/0010737 A1* | 1/2002 | Garcia-Luna-Aceves et al. | 709/203 |
| 2002/0181465 A1* | 12/2002 | Tsuchiya et al. | 370/392 |
| 2003/0079027 A1 | 4/2003 | Slocombe et al. | |
| 2004/0107234 A1* | 6/2004 | Rajahalme | 709/200 |
| 2004/0165565 A1 | 8/2004 | Omae et al. | |
| 2005/0010653 A1 | 1/2005 | McCanne | |
| 2005/0044141 A1 | 2/2005 | Hameleers et al. | |
| 2005/0149531 A1 | 7/2005 | Srivastava | |
| 2005/0164729 A1 | 7/2005 | Narayanan et al. | |
| 2005/0198367 A1 | 9/2005 | Ettikan | |
| 2006/0018299 A1 | 1/2006 | Yamamoto | |
| 2006/0018317 A1 | 1/2006 | Jimmei | |
| 2006/0130064 A1 | 6/2006 | Srivastava | |
| 2006/0193252 A1* | 8/2006 | Naseh et al. | 370/225 |
| 2006/0209885 A1 | 9/2006 | Hain et al. | |
| 2006/0221866 A1 | 10/2006 | Shepherd | |
| 2006/0233154 A1 | 10/2006 | Eckert et al. | |
| 2006/0236394 A1 | 10/2006 | Morrow et al. | |
| 2007/0088708 A1 | 4/2007 | Vijayarajan | |
| 2007/0133539 A1* | 6/2007 | Kang et al. | 370/392 |
| 2007/0243821 A1 | 10/2007 | Hundscheidt et al. | |
| 2008/0069099 A1* | 3/2008 | Tani et al. | 370/390 |
| 2008/0080513 A1 | 4/2008 | Kang et al. | |
| 2008/0123640 A1 | 5/2008 | Bhatia et al. | |
| 2008/0126529 A1 | 5/2008 | Kim et al. | |
| 2009/0113057 A1 | 4/2009 | Van der Merwe et al. | |
| 2010/0235441 A1* | 9/2010 | Christian et al. | 709/203 |

OTHER PUBLICATIONS

"Anycast CDNs Revisited," Hussein et al., Case Western Reserve University, Cleveland, OH, AT&T Labs—Research, Florham Park, NJ 07932, WWW 2008, Beijing, China, Apr. 21-25, 2008, pp. 277-286.

"Internet Protocol Version 6 (IPv6) Addressing Architecture," Hinden, Cisco Systems, The Internet Society, www.ietf.org, Apr. 2003.

"Generic Packet Tunneling in IPv6," Conta, Lucent Technologies, The Internet Society, www.ipv6-tf.com.pt/documentos/files/RFCs/rfc2473.txt, Dec. 1998.

\* cited by examiner

INTERNET PROTOCOL VERSION 6 CONTENT ROUTING

FIELD OF THE DISCLOSURE

The present disclosure generally relates to communications networks, and more particularly relates to Internet Protocol version 6 (IPv6) content routing.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
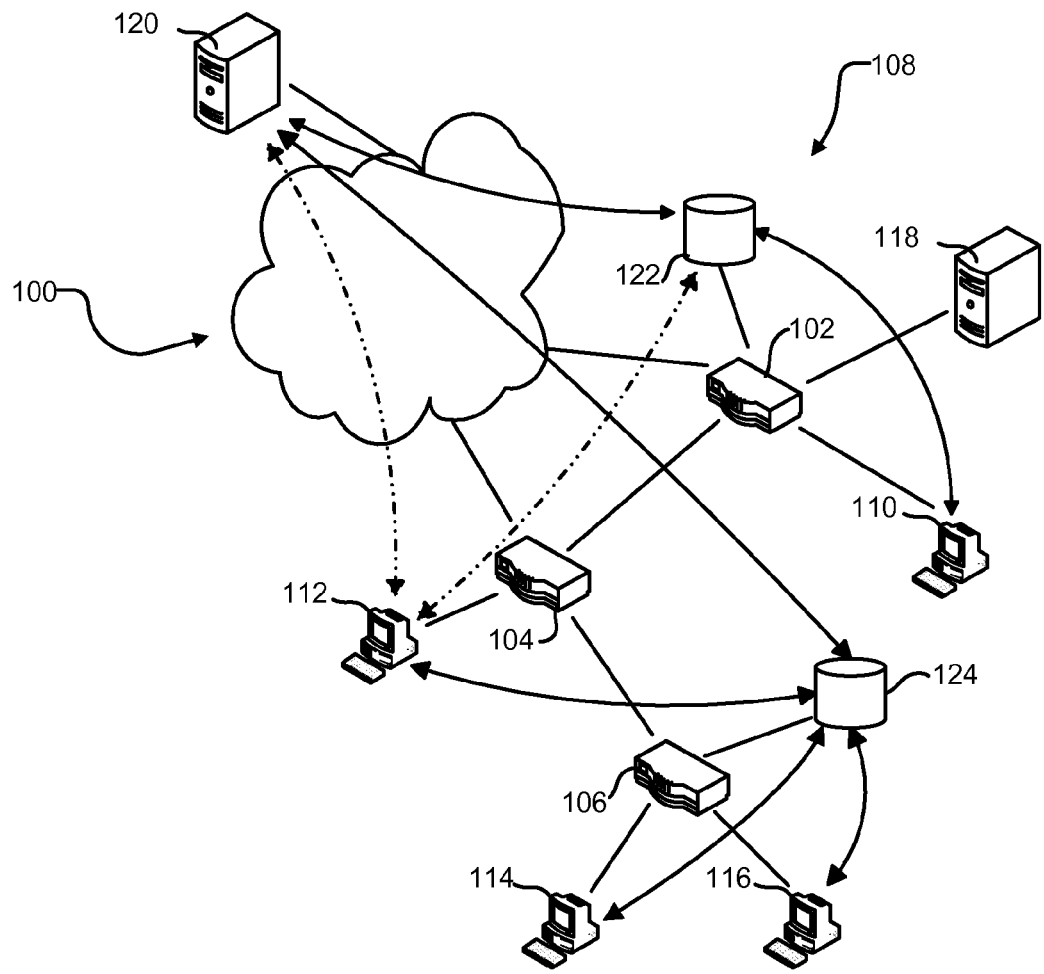
FIG. 1 is a block diagram illustrating a communications network in accordance with an embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
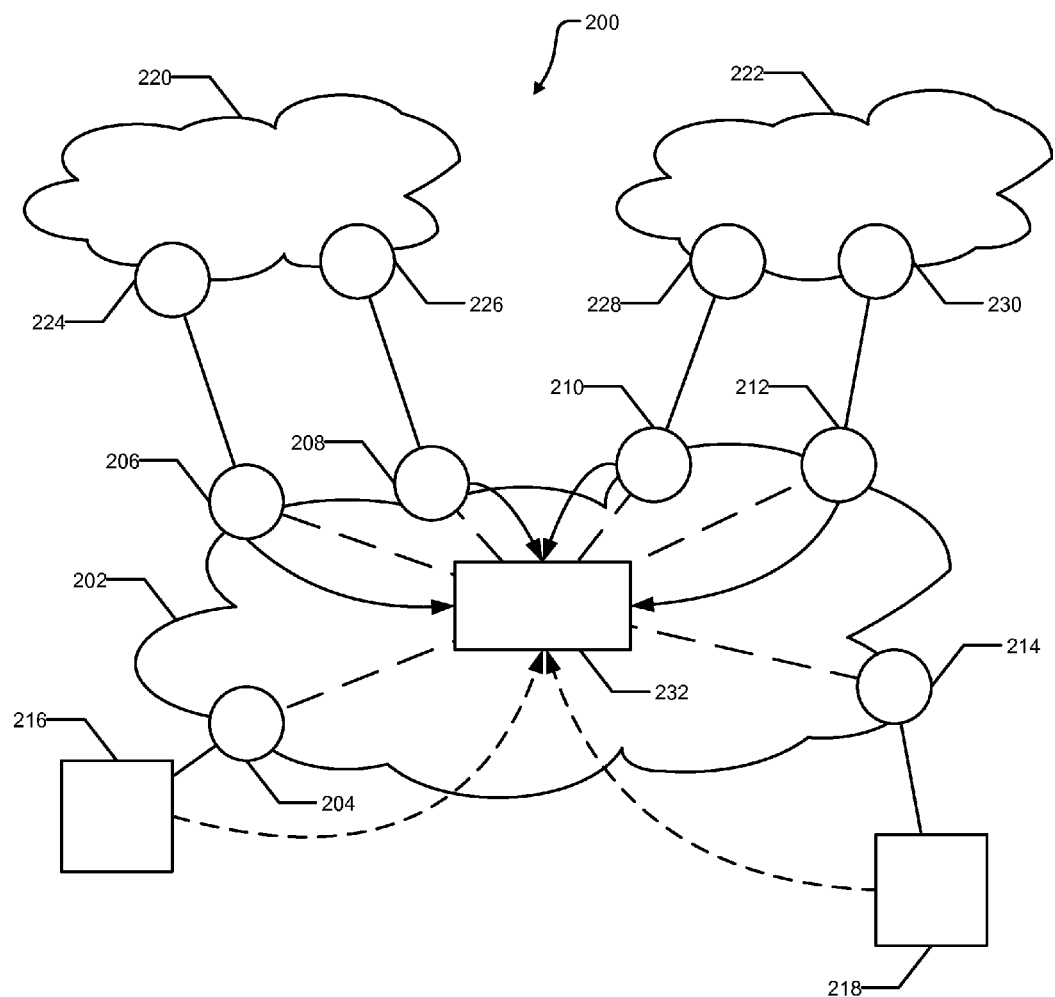
FIG. 2 is a block diagram illustrating an anycast CDN system in accordance with an embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204, 206, 208, 210, 212, and 214. The provider edge routers 204, 206, 208, 210, 212, and 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206, 208, 210, and 212 within the CDN provider network 202. As such, the route controller 232 can influence the routes selected by the provider edge routers 206, 208, 210, and 212. Additionally, the route controller 232 can receive load information from cache servers 216 and 218. The load information can include available bandwidth, bandwidth utilization, CPU utilization, memory utilization, number of requests being served, and the like.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206, 208, 210, and 212. Provider edge routers 206, 208, 210, and 212 can direct traffic addressed to the anycast address to either of the cache servers 216 and 218 based on the routes provided by the route controller 232. Additionally, the provider edge routers 206, 208, 210, and 212 can advertise the anycast address to AS 220 and to AS 222. The route controller 232 can manipulate the route provided to provider edge routers 206, 208, 210, and 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it is undesirable to provide an anycast addresses to client systems within an unstable network that can be subjected to frequent internal routing changes.

IPv6 is a next-generation Internet Protocol version designated as the successor to IPv4. IPv6 utilizes a significantly larger address space than IPv4, and thus is capable of solving problems associated with IPv4 address exhaustion. Specifically, IPv6 utilizes a 128-bit address space, as compared to the 32-bit addresses utilized by IPv4.

As used herein, an IPv6 anycast address is an IPv6 address as defined by Internet Engineering Task Force RFC 3513. Specifically, the IPv6 anycast address may not be used as a source address when the host advertising the IPv6 anycast address sends a response. Specifically, a cache server cannot reply to a client system using the IPv6 anycast address as the source address. The host responding to a request sent to an IPv6 anycast address can use an IPv6 unicast address for the source address of its response. Additionally, the response packet can also contain the IPv6 anycast address in a home address field to allow the requester, that is the client system, to match the response with the earlier request.

It should be noted that IPv6 Task Force RFC 2473 defines a method of tunneling IPv6 packets between hosts. In an example, host A can send a packet to host B. Instead of responding to the packet directly, host B can tunnel the packet to host C. Host C can respond to the packet by sending a response directly to host A.

Figure 3:
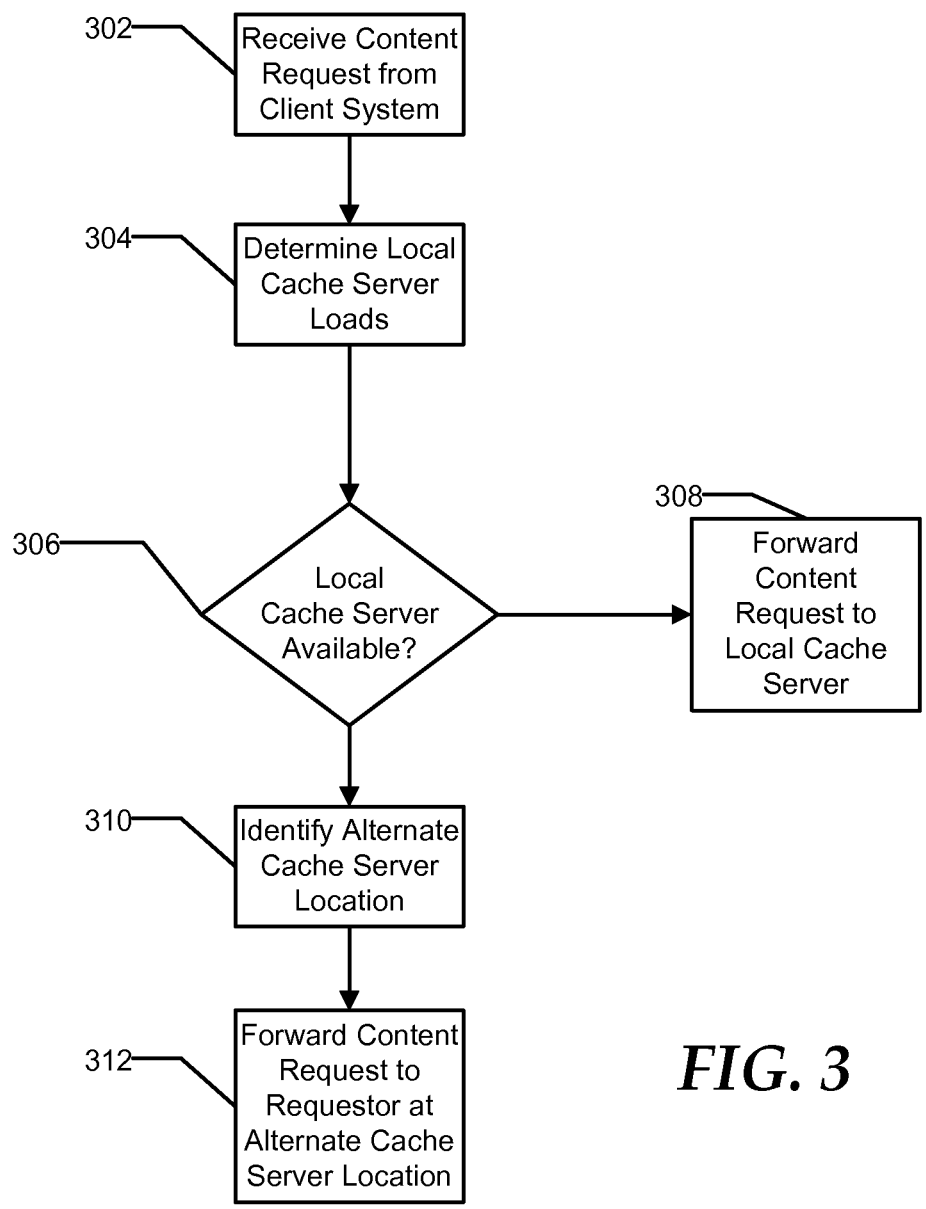
FIG. 3 is a flow diagram illustrating an exemplary method of directing a content request sent to an IPv6 anycast address in accordance with an embodiment of the present disclosure.

FIG. 3 shows a flow diagram illustrating a method for directing a content request sent to an IPv6 anycast address to a cache server. At 302, a redirector receives a content request from the client system. The content request can be addressed to the IPv6 anycast address. In an alternate embodiment, the content request can be forwarded from a remote redirector at another cache server location. At 304, the redirector can determine a load for a local cache server. The local cache server can be a cache server at the same location as the redirector. The load information can include CPU utilization, memory utilization, number of concurrent requests being served, amount of available bandwidth, or the like.

In an embodiment, the redirector can utilize the load information to balance requests among a plurality of local cache servers. In an example, the redirector can send the request to the local cache server with the lowest load. In another example, the redirector can distribute the requests in a round-robin process skipping any overloaded or unavailable local cache servers.

At 306, the redirector can determine if a local cache server is currently available. The local cache server can be available when the load for the local cache server is below an overload threshold. When the local server is available, the redirector can forward the packet to the local cache server, as illustrated at 308.

Alternatively, when no local cache server is available, the redirector can identify an alternate cache server location, as illustrated at 310. The alternate cache server location can be a cache server location with an available cache server. At 312, the redirector can foreword the content request to a redirector at the alternate cache server location.

In an embodiment, the redirector can receive load information from other redirectors at a plurality of alternate cache server locations. The other redirectors can provide an indication of the load state for the cache server location. For example, when at least one cache server is available, the other redirector can provide an indication that the cache server location is available. In another example, when no cache servers are available, the other redirector can provide an indication that the cache server location is not available.

In an embodiment, a cache server can be unavailable when the load exceeds an upper threshold, can be available for local requests only when the load exceeds a lower threshold but does not exceed the upper threshold, and can be available for both local requests and transferred requests when the load is below the lower threshold. Local requests can be requests from a client system forwarded by a local redirector. Transferred requests can be requests transferred from the redirector at another cache server location.

In an embodiment, the redirector can determine an optimal alternate cache server location based on the relative distance of the other cache server locations and the available capacity of the alternate cache server locations. In an alternate embodiment, the redirector can utilize a ranked list of alternate cache server locations and redirect the traffic to the highest ranked alternate cache server location currently available.

Figure 4:
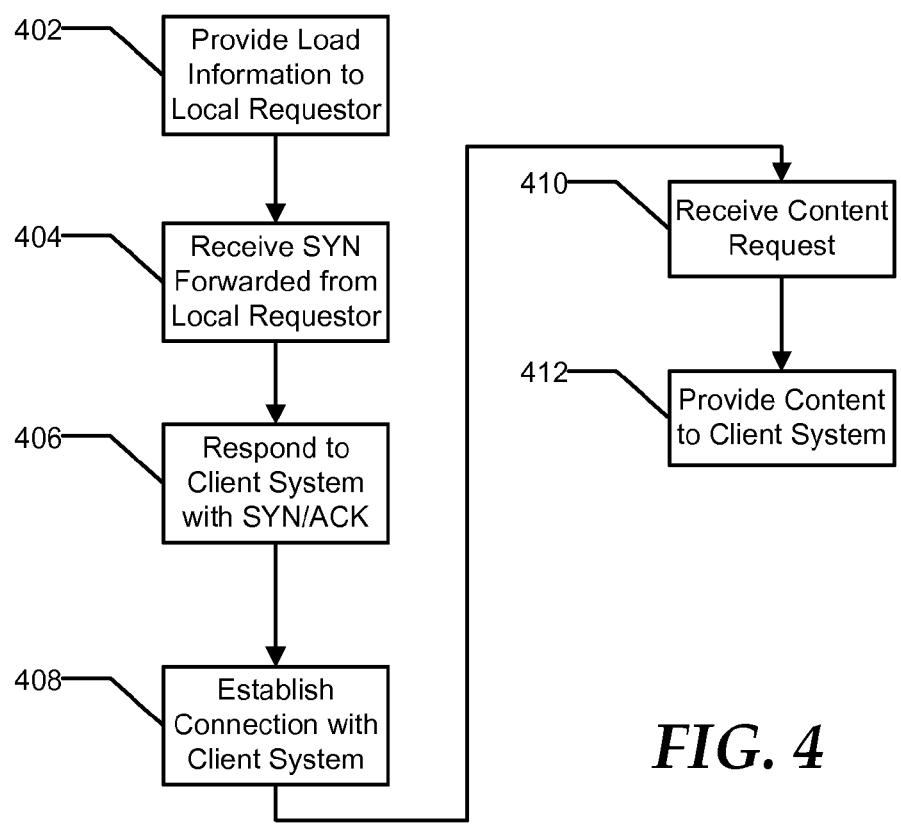
FIG. 4 is a flow diagram illustrating an exemplary method of responding to a content request sent to an IPv6 anycast address in accordance with an embodiment of the present disclosure.

FIG. 4 shows a flow diagram illustrating a method of responding to a request for content. At 402, a cache server can provide load information to a local requester. The load information can include CPU utilization, memory utilization, number of concurrent requests being served, amount of available bandwidth, or the like. At 404 the cache server can receive a SYN packet forwarded from the local requester. The SYN packet can be an initial packet establishing a connection for a content request from a client system. The SYN packet can include a source IP address corresponding to the IP address of the client system and the destination IP address corresponding to the IPv6 anycast address. At 406, the cache server can send a SYN/ACK packet to the client system. The SYN/ACK packet can include a destination address corresponding to the IP address of the client system, a source address corresponding to the IPv6 unicast address of the cache server, and a home address corresponding to the IPv6 anycast address for the content delivery network. At 408, the cache server can establish a connection with the client system. In an embodiment, the client system can send an ACK packet to the cache server in response to the SYN/ACK packet. In an embodiment, the ACK packet can be addressed to the IPv6 unicast address of the cache server. Once the connection is established, the cache server can receive a request for content from the client system, as illustrated at 410. The request for content can include a Universal Resource Locator (URL) associated with the content. The URL can include a domain name and a path identifying the content. At 412, the cache server can provide the content to the client system.

Figure 5:
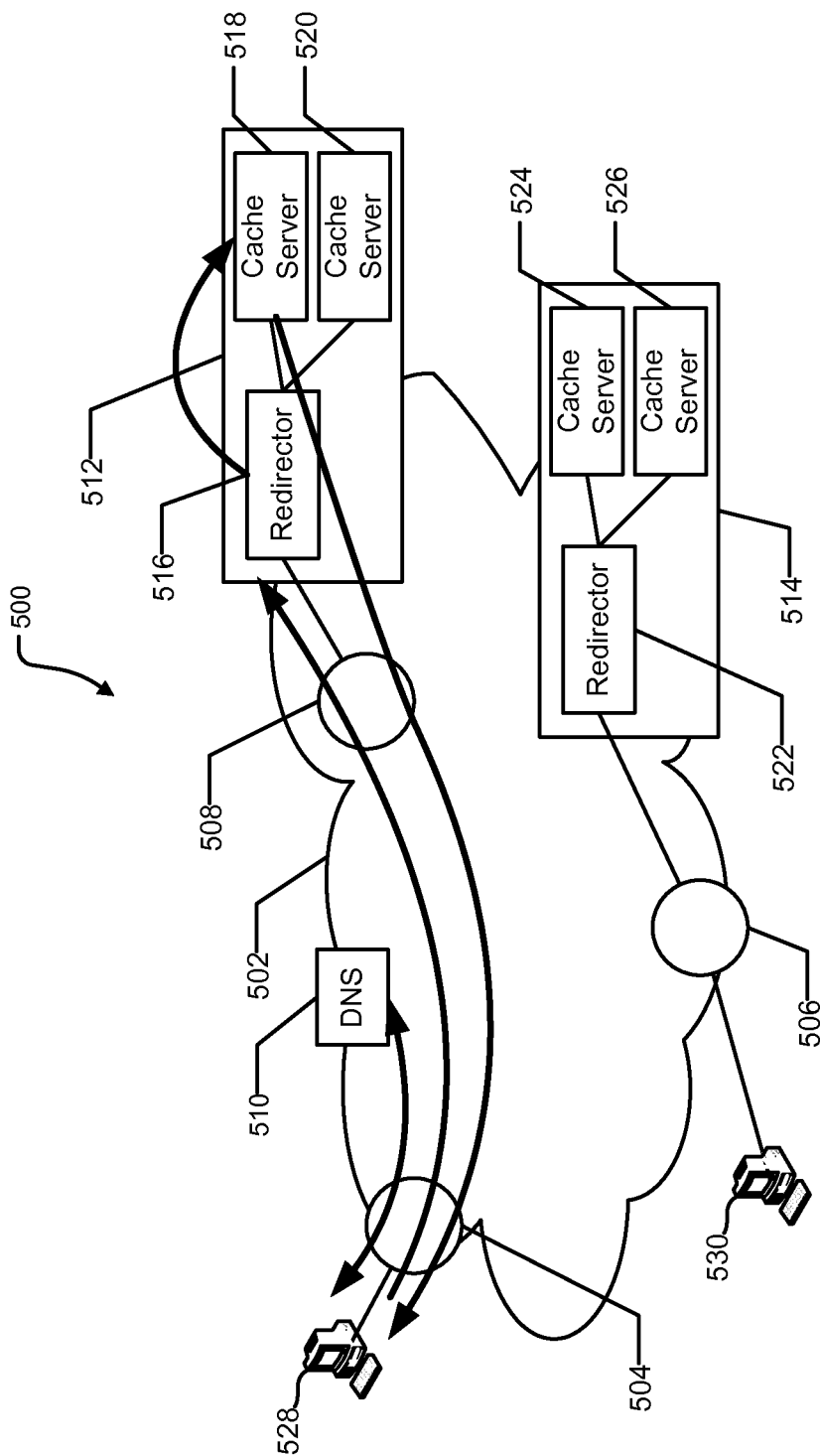
FIGS. 5 and 6 are block diagrams illustrating the behavior of an exemplary anycast CDN system in accordance with embodiments of the present disclosure.
Figure 6:
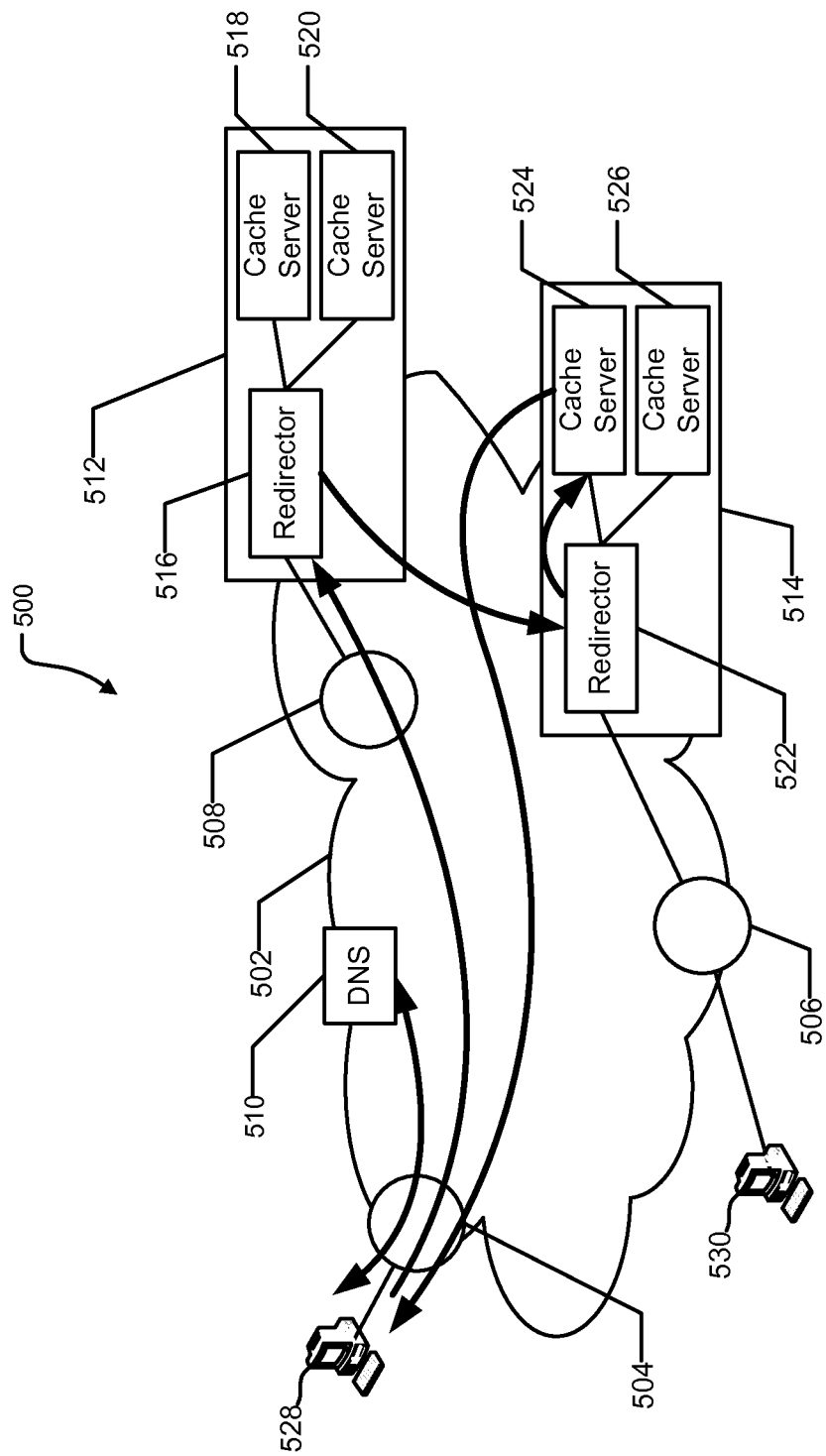

FIGS. 5 and 6 are block diagrams illustrating the behavior of an exemplary embodiment of a CDN 500. CDN 500 can include IPv6 network 502 having routers 504, 506, and 508, DNS server 510, and cache server locations 512 and 514. Cache server location 512 can include redirector 516 and cache servers 518 and 520. Cache server location 514 can include redirector 522 and cache servers 524 and 526. CDN 500 can provide content to client systems 528 and 530. In an embodiment, redirectors 516 and 522 can both advertise an IPv6 anycast address associated with CDN 500, such as by using Border Gateway Protocol (BGP).

Referring to FIG. 5, client system 528 can request an IP address for CDN 500 from DNS server 510. DNS server 510 can provide client system 528 with the IPv6 anycast address associated with CDN 500. Client system 528 can initiate a connection to CDN 500 by sending a SYN packet to the IPv6 anycast address. IPv6 network 502 can direct the SYN packet to redirector 516 at cache server location 512 based on the IPv6 anycast address. Redirector 516 can perform a handoff of the content request to cache server 518. Cache server 518 can respond to the client system 528 by sending a SYN/ACK packet directly to client system 528. The SYN/ACK packet can include a destination address corresponding to the IPv6 address of client 528, a source address corresponding to the IPv6 unicast address of cache server 518, and a home address corresponding to the IPv6 anycast address. In an embodiment, client system 528 and cache server 518 can establish a direct connection for providing content to client system 528.

Referring to FIG. 6, when cache servers 518 and 520 are both in an overloaded state, redirector 516 can redirect the request to an alternate redirector 522 at cache server location 514. Specifically, client system 528 can request an IP address for CDN 500 from DNS server 510. DNS server 510 can provide the IPv6 anycast address corresponding to CDN 500 to client system 528. Client system 528 can initiate a request by sending a SYN packet to the IPv6 anycast address received from the DNS server 510. IPv6 network 502 can direct the SYN packet to redirector 516. Redirector 516 can determined that cache server 518 and 520 are currently unavailable, for example, the load on each of cache server 518 and 520 are above an overload threshold.

Redirector 516 can hand off the request from client system 524 to redirector 522 at cache server location 514. Redirector 522 can hand the request to cache server 524 and cache server 524 can respond directly to client system 528. The response to client system 528 can include the destination address corresponding to the IP address of client system 528, the source address corresponding to the IPv6 unicast address of cache server 524, and a home address corresponding to the IPv6 anycast address for CDN 500. In an embodiment, upon receiving the response from cache server 524, client system 528 and cache server 524 can establish a direct connection for delivery of the content to client system 528.

Figure 7:
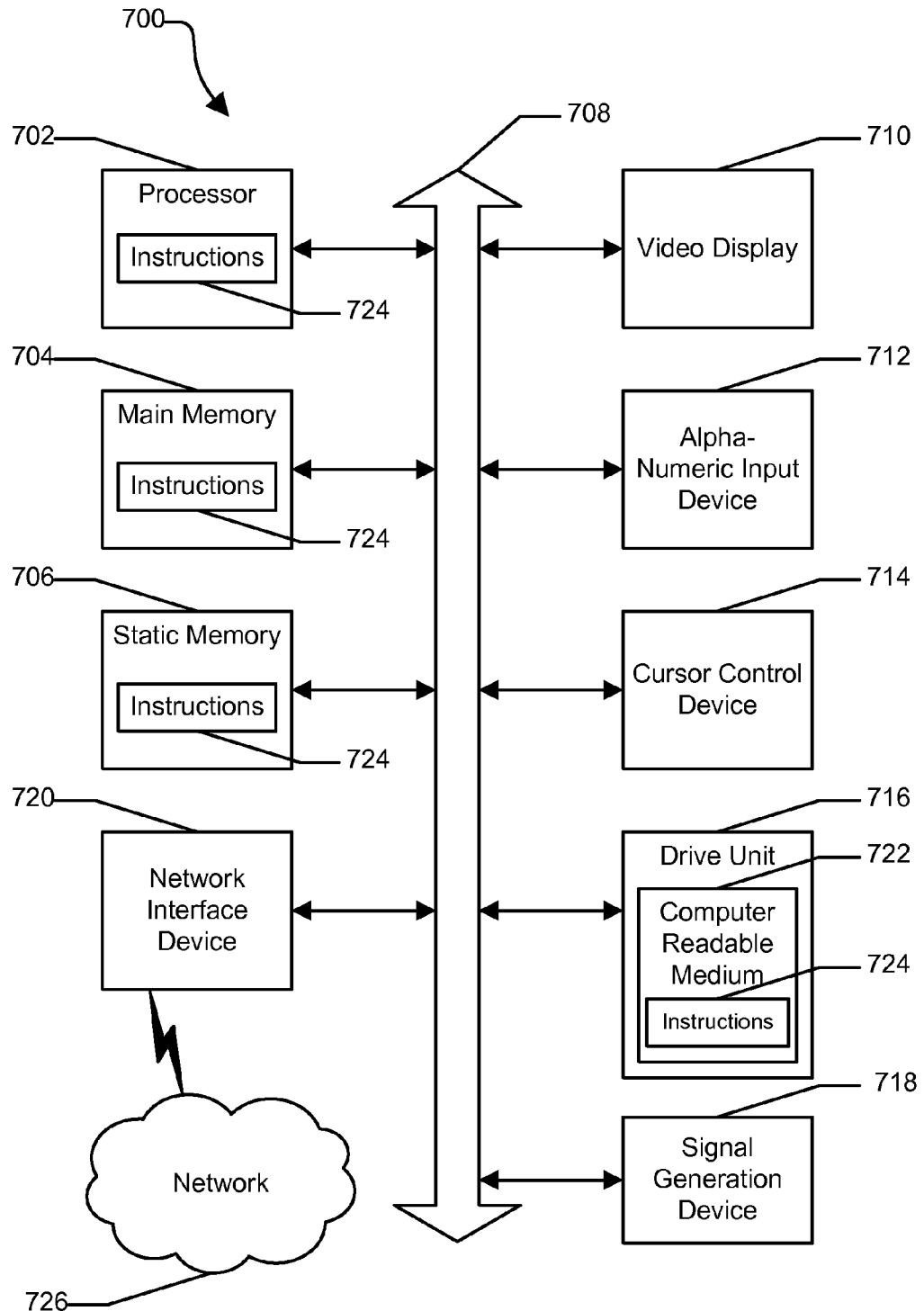
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A content delivery system comprising:
   a first cache server location including a first redirector and a first set of cache servers;
   a second cache server location including a second redirector and a second set of cache servers; and
   a domain name server that performs operations comprising:
      receiving a request for a cache server address; and providing an internet protocol version 6 anycast address; and
   wherein the first redirector performs operations comprising:
      receiving a content request from a client system, the content request addressed to the internet protocol version 6 anycast address;
      receiving load information from the first set of cache servers, wherein the load information comprises central processing unit information, memory utilization, a number of concurrent requests being served, and an amount of available bandwidth;
      receiving load information for the second cache server location from the second redirector;
      determining when a first cache server of the first set of cache servers is available, wherein
      the first cache server is available for only local requests when the first cache server
      has a load that is below an upper threshold for the first cache server and above a
      lower threshold for the first cache server, wherein the first cache server is available
      for both the local requests and transferred requests when the load is below the lower
      threshold, wherein the first cache server is unavailable when the load exceeds the
      upper threshold for the first cache server;

forwarding the request to the first cache server when the first cache server is available; and forwarding the request to the second redirector when the first set of cache servers are unavailable;

wherein the second redirector performs operations comprising:

receiving load information from the second set of cache servers;

receiving a content request forwarded from the first redirector;

selecting a second cache server of the second set of cache servers based on the load information received from the second set of cache servers; and forwarding the request to the second cache server, wherein the second redirector utilizes a ranked list of alternate cache server locations and redirects the content request to the second cache server when the second cache server is a highest ranked alternate cache server location currently available;

wherein each cache server of the first and second sets of cache servers performs operations comprising:

receiving the content request forwarded from the first or second redirector;

sending a response to the content request to the client system, the response including an internet protocol version 6 unicast address of the cache server as a source address, an internet protocol version 6 unicast address of the client system as a destination address, and the internet protocol version 6 anycast address as a home address; and providing the content to a requestor.

2. The content delivery system of claim 1, wherein the requestor performs an operation comprising advertising the internet protocol version 6 anycast address using border gateway protocol.

3. The content delivery system of claim 1, wherein the first redirector further performs operations comprising:

selecting one of the cache servers of the first set of cache servers based on the load information received from the first set of cache servers; and forwarding the content request to the selected cache server.

4. The content delivery system of claim 3, wherein the requestor performs an operation comprising selecting the cache server by determining the cache server with a lowest load.

5. The content delivery system of claim 3, wherein the requestor performs an operation comprising selecting the cache server by selecting the next cache server with a load below a threshold in a round robin process.

6. A redirector comprising:

a processor; and a storage medium having instructions that, when executed by the processor, cause the processor to perform operations comprising:

receiving a content request from a client system, the content request addressed to an internet protocol version 6 anycast address;

receiving load information from a local cache server, the local cache server co-located with the redirector, wherein the load information comprises central processing unit information, memory utilization, a number of concurrent requests being served, and an amount of available bandwidth;

receiving a load status for an alternate cache server location from a remote redirector, the load status indicating the alternate cache server location as available when a remote cache server has a load below an overload threshold, the remote cache server being co-located with the remote redirector at the alternate cache server location;

determining when the local cache server is available, wherein the local cache server is available for only local requests when the local cache server has a load that is below an upper threshold for the local cache server and above a lower threshold for the local cache server, wherein the local cache server is available for both the local requests and transferred requests when the load is below the lower threshold, wherein the local cache server is unavailable when the load exceeds the upper threshold for the local cache server;

forwarding the content request to the local cache server when the local cache server is available; and forwarding the content request to the remote redirector when the local cache server is not available, wherein the remote redirector utilizes a ranked list of alternate cache server locations and redirects the content request to a highest ranked alternate cache server location currently available.

7. The redirector of claim 6, wherein the local cache server includes a first and second local cache server and the operations further comprise:

selecting the first local cache server when a load of the first local cache server is lower than a load of the second local cache server; and forwarding the content request to first local cache server.

8. The redirector of claim 6, wherein the local cache server includes a first and second local cache server and the operations further comprise:

selecting the first local cache server when a load of the first local cache server is below a threshold and the first local cache server is next in a round-robin process; and forwarding the content request to first local cache server.

9. The redirector of claim 6, wherein the operations further comprise advertising the internet protocol version 6 anycast address using border gateway protocol.

10. A computer readable device comprising a plurality of instructions to manipulate a processor to perform operations comprising:

receiving a content request from a client system, the content request addressed to an internet protocol version 6 anycast address;

receiving load information from a local cache server, wherein the load information comprises central processing unit information, memory utilization, a number of concurrent requests being served, and an amount of available bandwidth;

receiving a load status for an alternate cache server location from a remote redirector, the load status indicating the alternate cache server location as available when a remote cache server has a load below an overload threshold, the remote cache server co-located with the remote redirector at the alternate cache server location;

determining when the local cache server is available, wherein the local cache server is available for only local requests when the local cache server has a load that is below an upper threshold for the local cache server and above a lower threshold for the local cache server, wherein the local cache server is available for both the local requests and transferred requests when the load is below the lower threshold, wherein the local cache server is unavailable when the load exceeds the upper threshold for the local cache server;

forwarding the content request to the local cache server when the local cache server is available; and forwarding the content request to the remote redirector when the local cache server is not available, wherein the remote redirector utilizes a ranked list of alternate cache server locations and redirects the content request to a highest ranked alternate cache server location currently available.

11. The computer readable device of claim 10, wherein the local cache server includes a first and second local cache server and the operations further comprise:

selecting the first local cache server when a load of the first local cache server is lower than a load of the second local cache server; and forwarding the content request to first local cache server.

12. The computer readable device of claim 10, wherein the local cache server includes a first and second local cache server and operations further comprise:

selecting the first local cache server when the first local cache server is available and is next in a round-robin process; and forwarding the content request to first local cache server.

13. The computer readable device of claim 10, wherein the operations further comprise advertising the internet protocol version 6 anycast address using border gateway protocol.

* * * * *